United States Patent [19]
Pakosh

[11] 3,712,403
[45] Jan. 23, 1973

[54] STEERING AND DRIVE ASSEMBLY FOR SELF-PROPELLED UNITS

[75] Inventor: Peter Pakosh, Winnipeg, Manitoba, Canada

[73] Assignee: Versatile Manufacturing Ltd., Winnipeg, Manitoba, Canada

[22] Filed: Feb. 8, 1971

[21] Appl. No.: 113,574

[52] U.S. Cl.....................180/6.48, 74/491
[51] Int. Cl. ..............................B62d 11/04
[58] Field of Search............180/6.2, 6.3, 6.48, 77 H; 74/491, 492, 496

[56] References Cited

UNITED STATES PATENTS

| | | | |
|---|---|---|---|
| 3,459,273 | 8/1969 | Leinhauser | 180/6.48 |
| 2,882,753 | 4/1959 | Pakosh | 180/6.2 X |
| 2,941,609 | 6/1960 | Bowers et al. | 180/6.48 |
| 3,224,196 | 12/1965 | Bennett | 180/6.48 X |
| 3,581,497 | 6/1971 | Krumholz | 180/6.48 X |
| 3,611,827 | 10/1971 | Bottum et al. | 180/6.48 X |
| 2,529,489 | 11/1950 | Curtis | 180/6.2 X |

*Primary Examiner*—Leon Friaglia
*Assistant Examiner*—Leslie J. Paperner
*Attorney*—Kent & Ade

[57] ABSTRACT

A combination pump and motor assembly is operative connected to each of the two drive wheels. The pump and motor assemblies are controlled in the forward mode by a single speed lever. A steering wheel operates a rack and pinion assembly having two racks each of which is operatively connected to one of the pump and motor assemblies so that turning the steering wheel speeds up one pump and motor assembly and hence one drive wheel and slows up the other pump and motor assembly and hence the other drive wheel. Means are provided to over-ride the steering mechanism so that one pump and motor assembly or the other can be reversed thus allowing very sharp turns.

22 Claims, 10 Drawing Figures

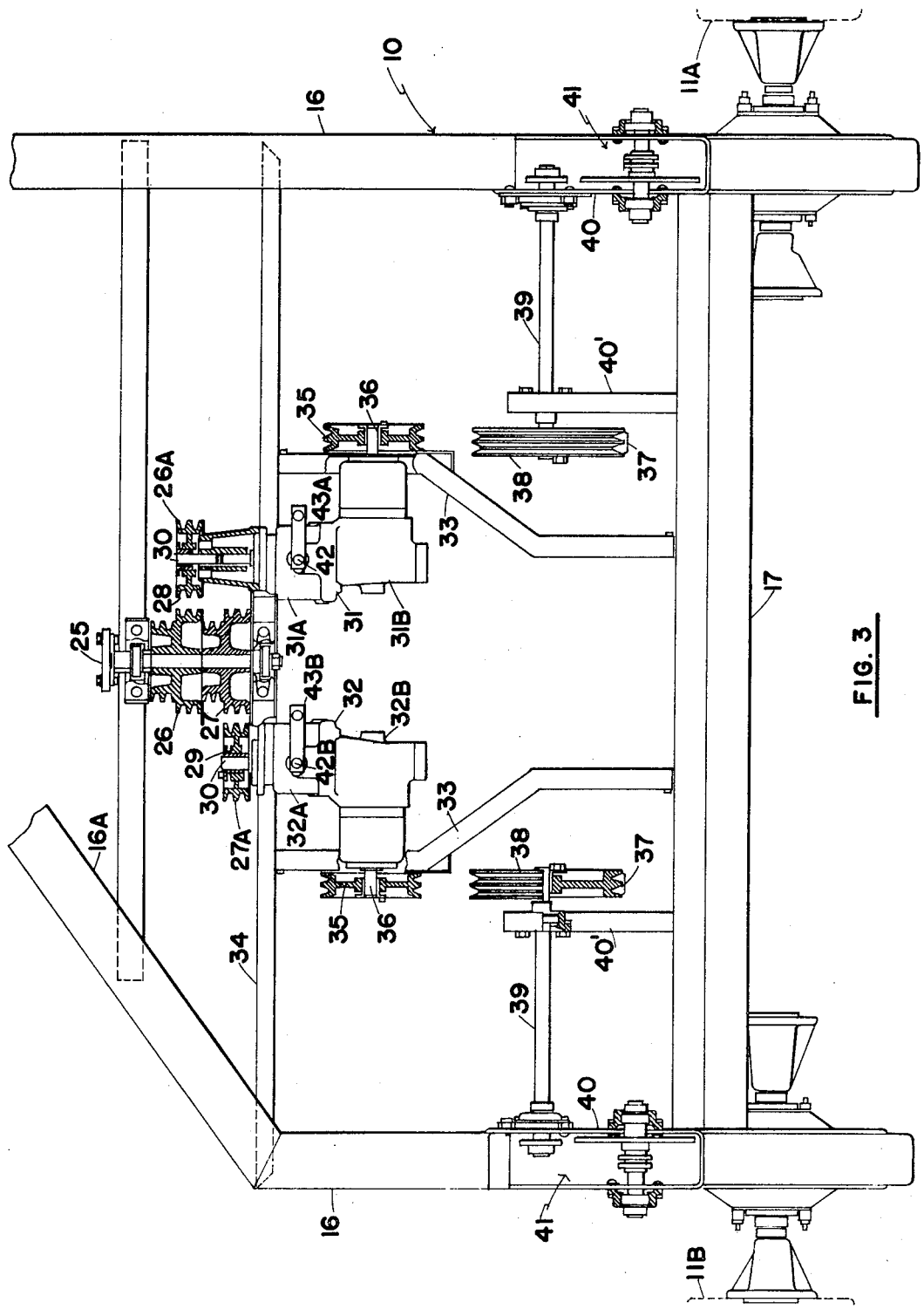

STEERING AND DRIVE ASSEMBLY FOR SELF-PROPELLED UNITS

This invention relates to new and useful improvements in self-propelled units, particularly self-propelled units which utilize a pump and motor assembly for driving for each of the drive wheels.

Although it is designed primarily for use with self-propelled farm machinery such as a self-propelled swather or a self-propelled combine, nevertheless it is readily adapted for use with other self-propelled vehicles and it is to be understood that the claims of this application do not limit the applicability of the invention to other forms of implements or vehicles.

Normally, self-propelled vehicles such as self-propelled swathers and the like are operated by a source of power through a system of belts, pulleys, gears and chains or chains or a combination of these, to the drive wheels one upon each side of the vehicle or implement.

Steering is accomplished either by a pair of levers operating through split pulley assemblies or, under certain circumstances, by a steering wheel and column also operating split pulley assemblies.

However, due to the advent of hydraulic pump and motor assemblies, steering and reversing presents certain problems and the principal object of this invention is to overcome these problems and provide a self-propelled unit which can be steered by a steering wheel operating through the pump and motor assemblies. Furthermore, means are provided to over-ride these steering assemblies in the event that it is necessary to reverse one drive wheel. This is often required when harvesting and it is desired to make a "square" corner or a right-angled turn in a minimum of space.

Another object of the invention is to provide a device of the character herewithin described which includes means to center the steering wheel and to place both pump and motor assemblies in neutral when the single speed lever is moved to the neutral position.

Another object of the invention is to provide a device of the character herewithin described in which a single speed lever controls the forward speed of the unit from a neutral position to full forward speed, the steering wheel operating the pump and motor assemblies regardless of the forward speed at which they are set.

A yet further object of the invention is to provide a device of the character herewithin described in which the riding reverse lever operates the pump and motor assemblies regardless of the position of the speed lever.

Another object of the invention is to provide a device of the character herewithin described which enables smooth and easy steering to be accomplished in such a unit as is described and yet at the same time permits the steering assembly to be over-ridden in the event that a sharp turn is required under which circumstances one drive wheel rotates forward and the other rotates rearwardly.

With the considerations and inventive objects herein set forth in view, and such other of further purposes, advantages or novel features as may become apparent from consideration of this disclosure and specification, the present invention consists of the inventive concept which is comprised, embodied, embraced or included in the method, process, construction, composiition, arrangement or combination of parts, or new use of any of the foregoing, herein exemplified in one or more specific embodiments of such concept, reference being had to the accompanying Figures in which:

FIG. 3 is a top plan view partially schematic of the drive connections to the ground wheels and the like.

In the drawings like characters of reference indicate corresponding parts in the different figures.

Figure 1:
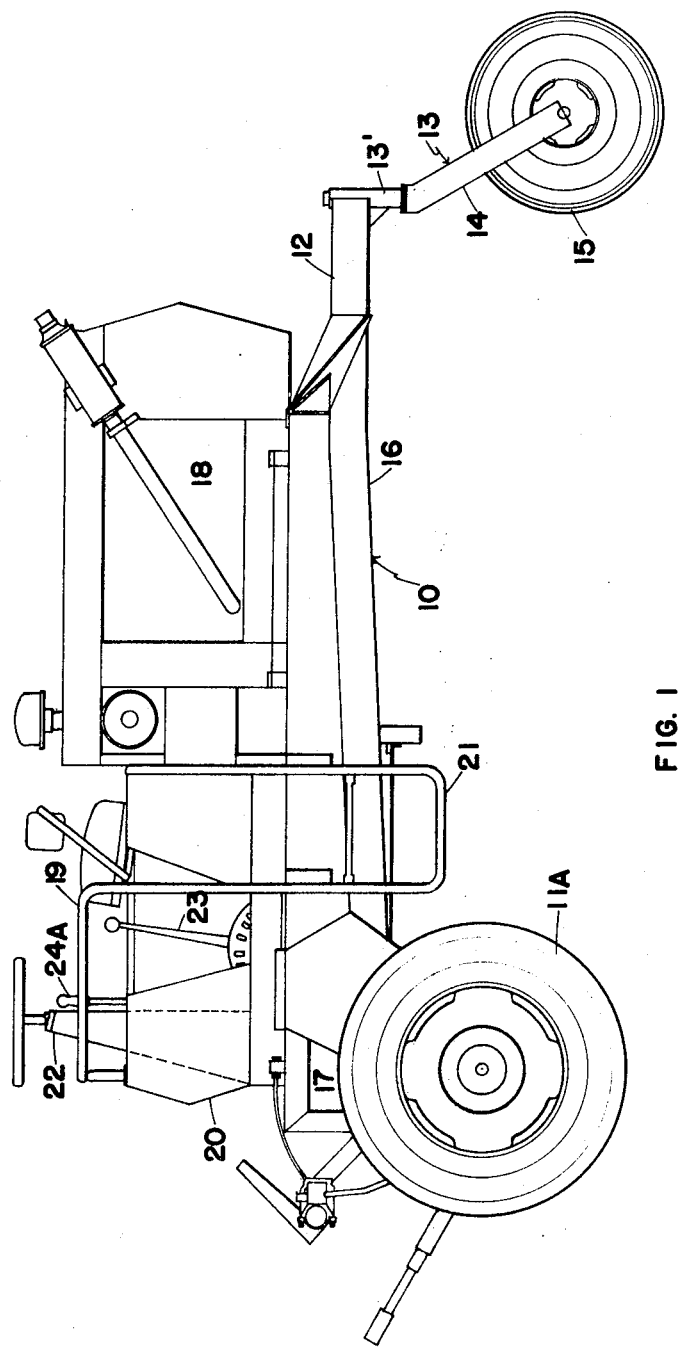
FIG. 1 is a side view of a self-propelled swather.
Figure 2:
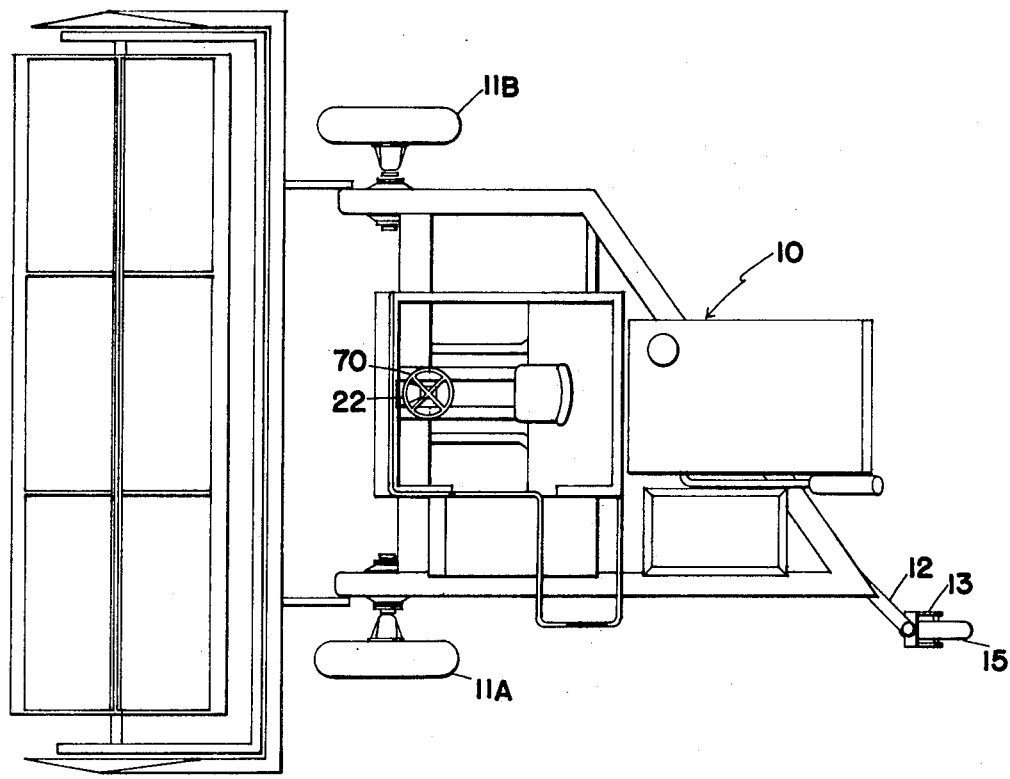
FIG. 2 is a top plan view.

Proceeding therefore to describe the invention in detail, reference to FIGS. 1 and 2 will show a self-propelled swather in general outline, including a frame generally designated 10 having a pair of front ground engaging drive wheels 11A and 11B.

At the rear end 12 of the frame, a ground engaging castoring wheel assembly collectively designated 13, is mounted within a vertical bearing sleeve 13' and includes the fork 14 and the ground engaging wheel 15.

The frame 10 generally includes a pair of spaced and parallel side girder members 16 and a transverse front beam 17. The side member 17 inclines inwardly and rearwardly as shown at 16A towards the rear end of the other side frame member 16 and at the junction of these two members, the aforementioned castoring wheel assembly 13 is mounted.

A source of power in the form of a diesel engine or the like is shown by reference character 18 and this is mounted towards the rear of the frame. A driver's position is indicated generally by reference character 19 forwardly of the source of power and includes the enclosure 20 access to which is reached by steps 21 in the usual manner.

Situated within the enclosure is a steering assembly collectively designated 22, a speed lever 23 and a pair of reversing levers 24A and 24B.

Reference to FIG. 3 will show a main drive shaft assembly 25 and this assembly is connected to the source of power 18 in the usual way, but it is not believed necessary to show details.

Belt pulleys 26 and 27 are mounted upon drive shaft 25 and drive belts 26A extend around pulley 26 and around a further pulley 28.

Similar belts 27A extend around pulley 27 and a further pulley 29.

Pulleys 28 and 29 are mounted upon the drive shaft 30 of combination pump and motor assemblies collectively designated 31 and 32 mounted upon frame members 33 which in turn extend between the front beam 17 and a cross beam 34 as clearly shown in FIG. 3.

These pump and motor assemblies are conventional and power from the engine 18 drives the pump portions 31A and 32A which in turn operate the hydraulic motor portions 31B and 32B respectively.

Pulleys 35 are driven by the output shafts 36 of the motors 31B and 32B and drive belts 37 extend around the pulleys and around further pulleys 38 mounted upon shafts 39 which in turn are supported within bearings carried by brackets 40 as clearly shown in FIG. 3.

Chain and sprocket assemblies collectively designated 41 connect shafts 39 to the aforementioned drive wheels 11A and 11B in the usual manner and as such construction is well known, it is not believed necessary to go into details of this particular portion of the assembly.

The speed of the pump and motor assemblies 31 and 32 are controlled internally in a conventional manner by rotation of control shafts 42A and 42B which in turn are operated by speed control levers or cranks 43A and 43B respectively.

Figure 4:
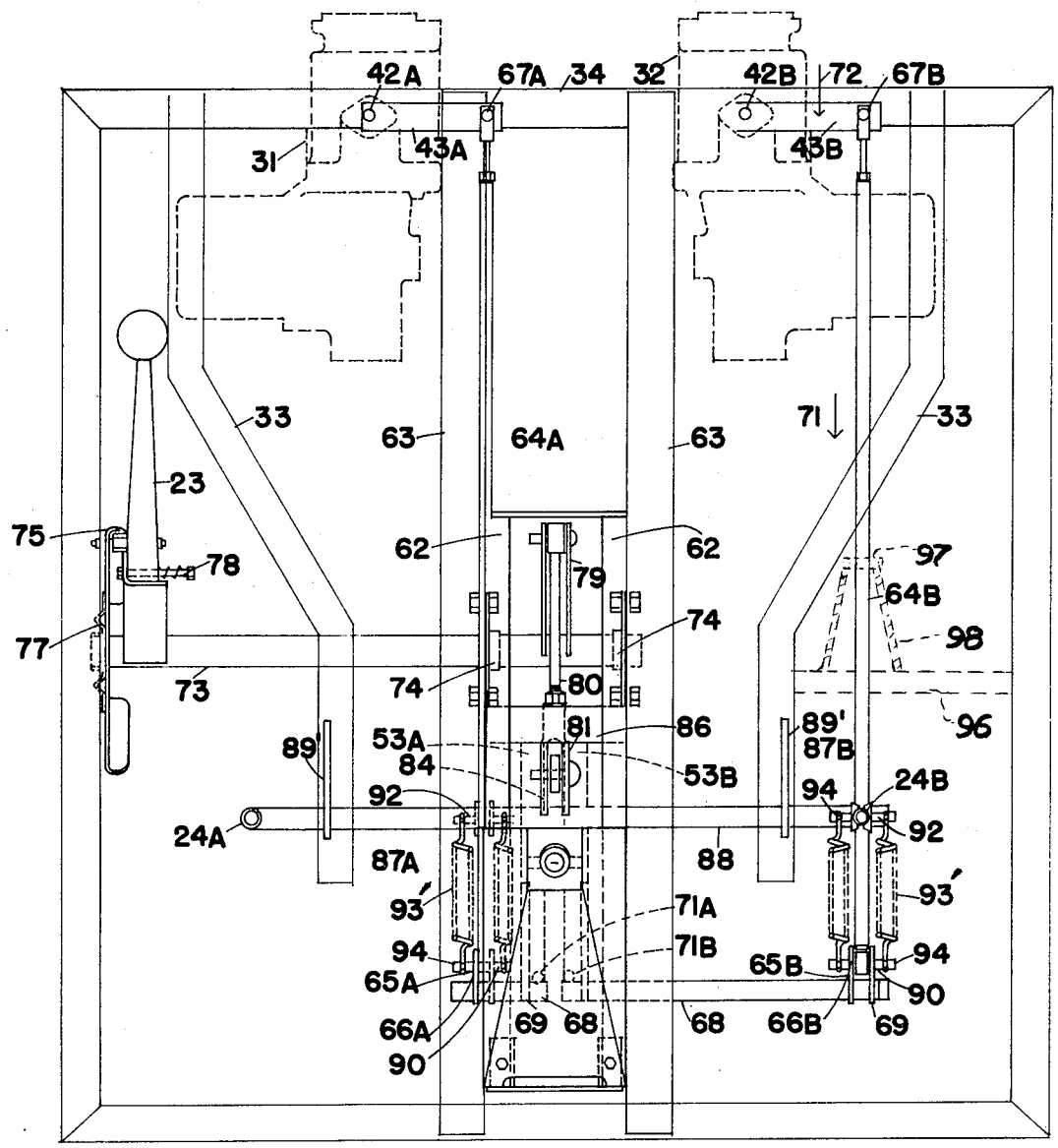
FIG. 4 is a top plan view of the steering and drive control mechanism.
Figure 5:
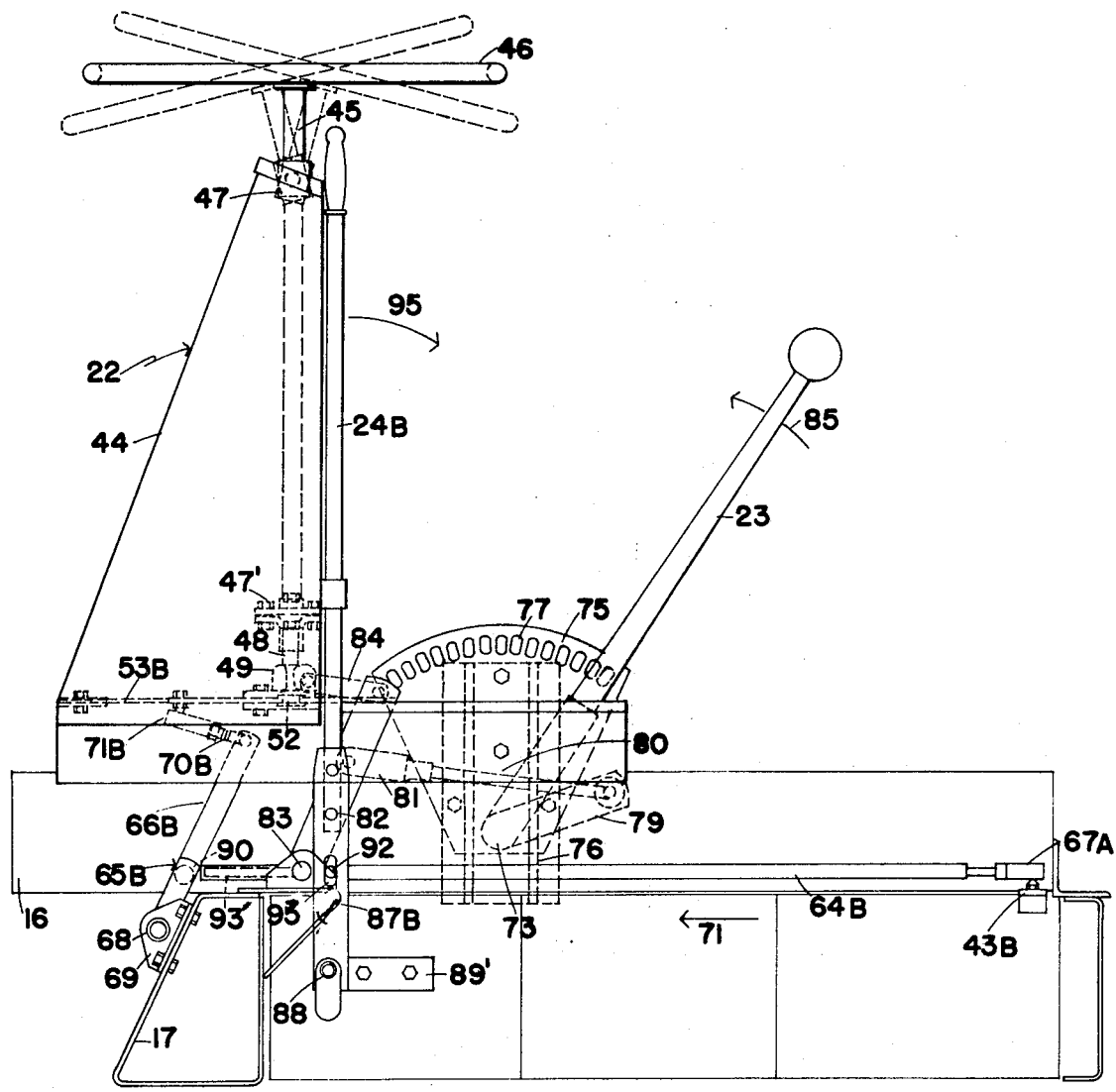
FIG. 5 is a side view of FIG. 4.
Figure 6:
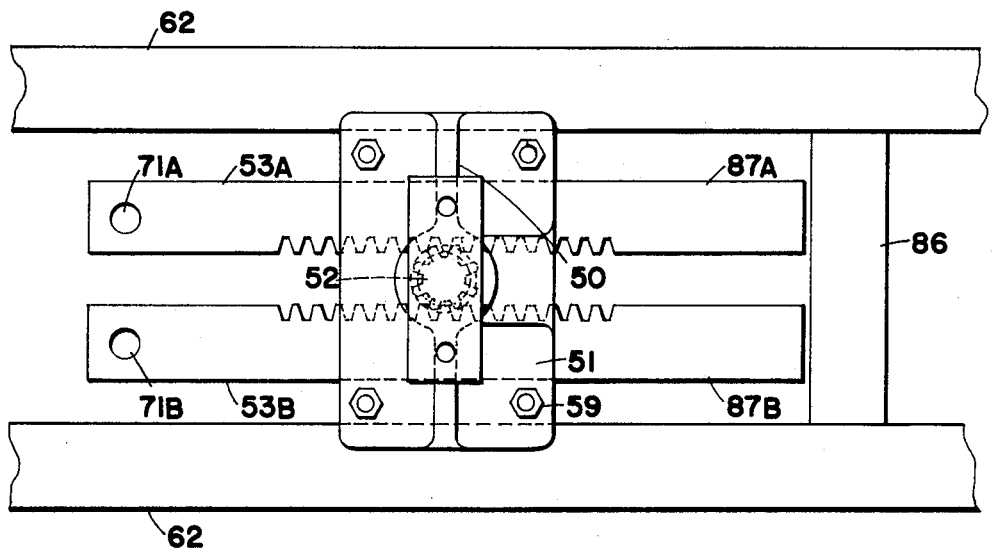
FIG. 6 is a top plan view of the rack and pinion assembly of the steering device.

Means are provided to operate these speed control levers 43A and 43B from the aforementioned steering assembly 22 and in this connection reference should be made to FIGS. 4 and 5.

An upwardly extending support component 44 is secured by the base thereof within the enclosure 20 and a steering column 45 is supported within this support. A steering wheel 46 is secured to the upper end of the steering column and this column is pivotally supported at the upper end of the support component 44 by means of a ball joint bearing assembly 47 which permits the steering wheel 46 to be tilted fore and aft as will hereinafter be described.

Adjacent the lower end of the steering column, a universal joint 47 is provided and a relatively short rod portion 48 of the steering column extends from the universal joint downwardly therefrom.

A casing collectively designated 49 includes a hub 50 within which the aforementioned lower portion 48 is bearably supported and below this hub is substantially rectangular block or plate 51. A pinion 52 is secured to the lower end of the portion 48 of the steering column and is situated below the upper plate 57 of the casing and a pair of spaced and parallel rack bars 53A and 53B engage the pinion 52 one upon each side thereof. Recessed portions 54 are formed upon the underside of the upper plate 57 and the rack bars run within these recessed portions being held in position by means of a lower plate 58 spanning the underside of the casing and being secured thereto by means of nut and bolt assemblies 59. This permits the rack bars to be moved longitudinally and in opposite directions to one another, by rotation of the steering column 45, due to the engagement of the pinion 52 with the two rack bars as clearly shown in FIGS. 6, 7, 8 and 9.

The casing itself, generally designated 49, is in turn supported for longitudinal movement within limits and in this connection, a longitudinally extending groove 60 is formed upon each side of the upper plate portion 57. These grooves engage flanges 61 of spaced and parallel channels 62 which in turn are secured to a pair of longitudinally extending spaced and parallel frame members 63.

Link rods 64A and 64B are each pivotally secured by one end thereof as indicated by general reference character 65A and 65B, to intermediate the ends of links 66A and 66B, details of which will hereinafter be described.

The other ends of the link rods 64A and 64B are connected by an adjustable ball joint component 67A and 67B, to the ends of the aforementioned speed control levers 43A and 43B respectively.

The aforementioned links 66A and 66B are pivotted by the lower ends thereof to a shaft 68 which in turn is mounted between pairs of lugs 69 secured to the front beam assembly 17.

An adjustable connecting link 70A and 70B is pivotally secured by one end thereof to the upper ends of links 66A and 66B respectively and by a ball joint 71A and 71B, to adjacent one end of the aforementioned rack bars 53A and 53B respectively, details being shown in FIG. 5.

From the foregoing it will be appreciated that rotation of the steering wheel, which moves the two rack bars 53A and 53B in opposite directions, will also move the link rods 64A and 64B in opposite directions thus operating the control shafts 42A and 42B of the pump and motor assemblies 31 and 32. It will also be apparent that due to the opposite movement of the link rods 64A and 64B, one pump and motor assembly will be speeded up and the other will have its speed reduced so that a turn will be initiated with the faster ground engaging wheel rotating around slower wheel.

As an example, rotation of the steering wheel in the direction of arrow 70 (FIG. 4) will cause link rods 64B to move in the direction of arrow 71 thus rotating control shaft 42B in the direction of arrow 72 and slowing down the pump and motor assembly 32.

At the same time, link rods 64A will move in the opposite direction of arrow 71 and rotate the control shaft 42A in the opposite direction thus speeding up the pump and motor assembly 31, it being understood that the respective ground wheels are also slowed down and speeded up respectively.

The forward speed of the vehicle or unit is controlled by the speed lever 23 which is mounted by the lower end thereof upon a shaft 73 journalled within bushings 74 supported within the aforementioned frame members 63.

A quadrant plate 75 is secured to a vertical bracket 76 and this quadrant plate is provided with a plurality of apertures or depressions 77 as shown in FIG. 5.

A springloaded pin assembly 78 extends through the lever 23 and engages within any one of the apertures or depressions 77 so that the lever 23 does not move from the set position until it is desired to change the speed.

Also mounted upon the cross shaft 73 is a pair of lugs or links 79 and adjustable yoke link 80 is pivotally secured by one end thereof between these links or lugs 79. The other end of this yoke link is in turn pivotally secured by means of a yoke 81, intermediate the ends of a single link 82. This link in turn is pivotally secured by the lower end thereof to a pivot 83 supported by the front beam 17 as shown in FIG. 5.

Figure 7:
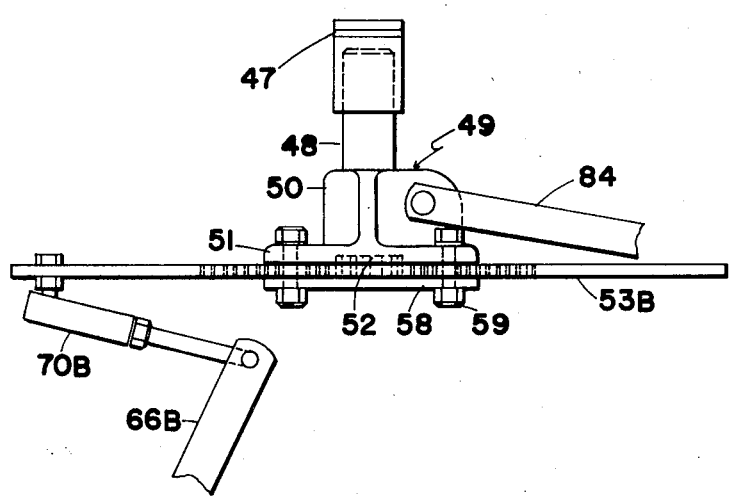
FIG. 7 is a side view of FIG. 6.

A relatively small link 84 is pivotally secured by one end thereof to the upper end of the single link 82 and by the other end thereof to the hub 50 as shown in FIG. 7.

Therefore movement of the speed lever 23 from the position shown in FIG. 5, in the direction of arrow 85, will move the casing 49 together with both rack bars 53A and B, in the direction of arrow 71 (see FIG. 5). This in turn will cause both links bars 64A and B also to move in the direction of arrow 71 thus rotating the control rods 42A and B in the direction of arrow 72 thus increasing the speed on both drive wheels equally. Regardless of the final position of the speed control 23, the steering can be controlled by the steering wheel 46 operating the two rack bars in opposite directions as hereinbefore described.

Due to the movement of the entire rack bar assembly together with the pinion and casing 49, it will be appreciated that the pinion will be moved longitudinally also thus causing the steering column 45 to pivot around its upper pivot 47 thus causing the steering wheel to tilt forwardly or rearwardly as hereinbefore described.

Under normal circumstances, the steering wheel will control the steering characteristics of the unit satisfactorily.

However, when the unit is a self-propelled swather, for example, it is often desirable that an extremely sharp turn be made when harvesting a field in order to form what is known as a "square" corner.

Under these circumstances it is necessary to actually reverse the movement of drive wheel while maintaining the forward motion of the opposite drive wheel and in this connection means are provided to override the steering wheel control of the link rods 64A and B.

However, prior to describing this portion of the invention, mention should be made of the stop 86 which consists of a strip or bar extending between the channel members 63 in alignment with the rack bars 53A and B. This stop is positioned so that when the speed lever 23 is in the neutral position shown in FIG. 5, the ends 87A and B of the rack bars 53A and B, respectively, strike this stop.

If the steering wheel is turned when the speed lever 23 is moved to the neutral position, one rack bar 53A or B will strike the stop first and further movement of the speed control lever towards the neutral position will cause the pinion to rotate thus bring the other rack bar into contact with the stop 86 and centering the steering wheel 46 and it will be observed that the steering wheel cannot be turned when the speed control lever is in the neutral position.

Figure 8:
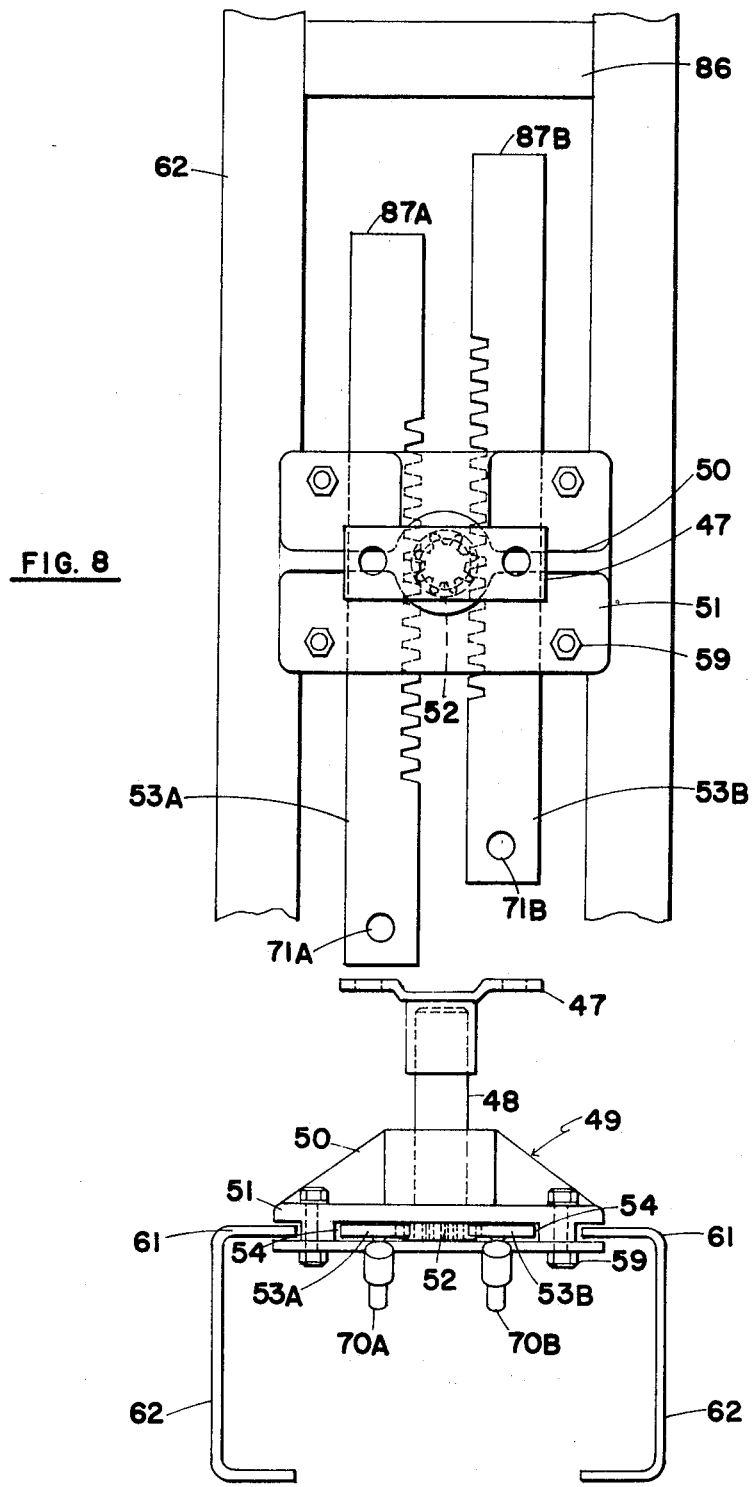
FIG. 8 is a view similar to FIG. 6, but showing the assembly in a different position.
Figure 9:
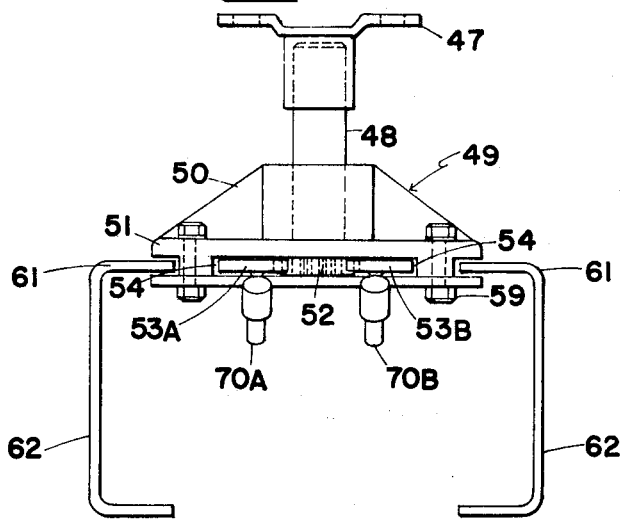
FIG. 9 is an elevation of FIG. 6.

FIG. 8 shows the position of the rack bars when the speed control lever is advanced from the neutral position and the ends of the rack bars are away from the stop so that they can be operated independently and in opposite directions by means of the steering wheel 46 as hereinbefore described.

Referring back to the means to override the steering control the link rods 64A and B, reference should be made to the aforementioned reversing levers 24A and B. Each of these levers extends upwardly adjacent to the steering wheel 46 and includes a bifurcated lower end 87A and B, said bifurcated lower ends extending around the rods 64A and B respectively. The lower extremities of the bifurcated portions are pivoted to a cross bar or tube 88 which in turn is supported within brackets 89 secured to frame members 33.

Figure 10:
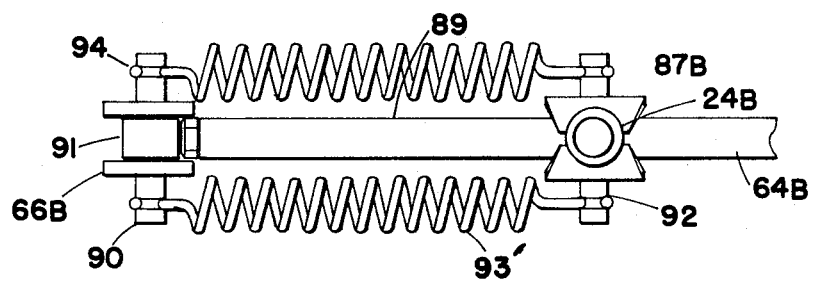
FIG. 10 is an enlarged plan view partially sectioned of the reverse and over-ride mechanism.

Referring back to the pivotal connection 65A and 65B between the ends of the control rods 64A and B to the links 66A and B, reference to FIG. 10 will show that a relatively short rod 89 slidably engages within the end of the rods 64A and B which takes the form of a tube. A first pivot pin 90 extends through the links 65A and B and through a ball joint 91, links 66A and B consisting of two plates one upon each side of the ball joint 91.

It should be observed that the ends of this first pivot pin extend beyond the links 66A and B.

A second pivot pin 92 extends through the rods 64A and B between the ends thereof and through vertical slots 93 formed in the bifurcated ends 87A and B of the reverse levers. Once again it should be noted that the extremities of this pivot pin 92 extend beyond the bifurcated sides of the reverse levers.

Tension springs 93' extend between the extremities of pivot pin 90 and pivot pin 92 engaging within grooves 94 formed on the extending extremities of these pivot pins.

From the foregoing it will be appreciated that when the link rods 64A and B are actuated by means of the links 66A and B (that is by the operation of the steering wheel 46) the tension of springs 93' transfers the motion from the links 66A and B directly to the rods 64A and B.

However, when it is desired to override the steering and to reverse one of the pump and motor assemblies, the relevant reversing lever 24A and B is moved in the direction of arrow 95 or rearwardly. This causes the bifurcated portion of the reversing lever to move the link rod due to the engagement of the second pivot pin 92 therewith, overriding the tension of springs 93' and extending same so that the end of the link rods 64A and B slides away from the relatively short rod 89.

This causes the control rod 42A and B of the pump and motor assembly to move in the opposite direction thus causing the relevant pump to reverse and to reverse the motion of the drive wheel driven thereby.

As soon as the reverse lever is released, the tension springs 93' return it to the original position.

It will be observed that these reversing levers override the steering mechanism regardless of the position of the speed lever 23 so that such turns can be made at any speed desired.

Once this type of turn is completed, of course, the steering wheel 46 once again becomes operative and steering can proceed in the usual manner as hereinbefore described.

Finally reference should be made to FIG. 4 in which an alternative mounting for the springs 93' is shown in phantom. A brace 96 extends across the frame and a bracket 97 is clamped to the rod 64B. Tension springs 98 extend between bracket 97 and fixed brace 96 and bias the rod 64B towards shaft 68.

Several advantages flow from this construction including the fact that all linkage play in the system is taken up by the springs 98, yet they still operate in a manner similar to springs 93'. Furthermore the positions of the springs in this location give "feel" or "-presence" to the steering wheel.

Various modifications can be made within the scope of the inventive concept which is herein disclosed and/or claimed.

What I claim as my invention is:

1. In a self-propelled unit including a frame, a source of power in said frame, at least two ground engaging drive wheels journaled one upon each side of said frame, and a pair of combination pump and motor assemblies mounted in said frame, one being operatively connected to one drive wheel and the other being operatively connected to the other drive wheel, and speed control means on each of said pump and motor assemblies, the improvement which consists of a steering component and a speed lever, both mounted in said frame, linkage means extending between said steering component and the speed control means of each of said pump and motor assemblies, whereby when one pump and motor assembly increases in speed, the other pump and motor assembly decreases in speed and vice-versa, when said steering component is operated thus initiating steering movement to said unit, said steering component including a pinion rotated by said steering component, a pair of longitudinally extending rack bars one upon each side of said pinion and in spaced and parallel relationship with one another and engageable with said pinion, said linkage means being operatively connected between each rack bar and each of said speed control means, means mounting said rack bars for limited longitudinal sliding movement, and stop means engageable by one end of each of said rack bars when said speed lever is moved to the neutral position thereby centering said steering component and moving said speed control means on both of said pump and motor assemblies, to the neutral position.

2. The improvement according to claim 1 which includes a steering wheel, a steering column rotatable by said wheel, said pinion being mounted on the lower end of said steering column.

3. The improvement according to claim 2 in which said means mounting said rack bars for limited longitudinal sliding movement includes a casing, a hub on said casing, the lower end of said steering column being journaled for rotation in said hub, said pinion gear being situated in said casing, said rack gears being supported in said casing one upon each side of said pinion gear.

4. The improvement according to claim 3 in which said speed lever includes means within which speed lever engages in a plurality of incremental positions, linkage operatively extending between said speed lever and said casing mounting said rack gear and said pinions, and means on said frame mounting said casing for limited longitudinal sliding movement.

5. The improvement according to claim 4 in which steering column is pivoted adjacent the upper end thereof to said frame, and a universal joint in said steering column adjacent the lower end thereof.

6. The improvement according to claim 5 which includes a reversing lever for each of said pump and motor assemblies, each of said reversing lever including linkage means operatively connecting said reversing levers to one each of said pump and motor assemblies.

7. The improvement according to claim 6 which includes further means on said linkage means enabling said reversing levers to override said rack gears.

8. The improvement according to claim 7 in which each of said link rods operatively connected between said rack gears and said speed control means includes a link pivotted by one end thereof to said frame and by the other end thereof to adjacent one end of said rack bars, said further means in said linkage means including a relatively short rod slidably engageable in one end of said link rod, a first pivot pin engaging through one end of said short rod and through said link intermediate the ends of said link, the ends of said pivot pin extending upon each side of said link, said reversing lever being pivotted by the lower end thereof to said frame, a second pivot pin extending through said reversing lever and through said link rod, said second pivot pin extending upon each side of said link rod and said reversing lever, and tension springs extending between the extending ends of said first pivot pin and the extending ends of said second pivot pin.

9. The improvement according to claim 4 which includes a reversing lever for each of said pump and motor assemblies, each of said reversing levers including linkage means operatively connecting said reversing levers to one each of said pump and motor assemblies.

10. The improvement according to claim 9 which includes further means on said linkage means enabling said reversing levers to override said rack gears.

11. The improvement according to claim 10 in which each of said link rods operatively connected between said rack gears and said speed control means includes a link pivotted by one end thereof to said frame and by the other end thereof to adjacent one end of said rack bars, said further means in said linkage means including a relatively short rod slidably engageable in one end of said link rod, a first pivot pin engaging through one end of said short rod and through said link intermediate the extending upon of said link, the ends of said pivot pin extending upon each side of said link, said reversing lever being pivotted by the lower end thereof to said frame, a second pivot pin extending through said reversing lever and through said link rod, said second pivot pin extending upon each side of said link rod and said reversing lever, and tension springs extending between the extending ends of said first pivot pin and the extending ends of said second pivot pin.

12. A self-propelled unit comprising in combination a frame, a source of power in said frame, a pair of ground engaging ground wheels one upon each side of said frame and at one end thereof, a castoring wheel assembly supporting the other end of said frame, a pair of combination pump and motor assemblies mounted in said frame, one for each drive wheel, said pump and motor assemblies being operatively connected one to each of said drive wheels, means operatively connecting said source of power to said pump and motor assemblies, speed control means on each of said pump and motor assemblies, a steering component in said frame and a speed lever also mounted in said frame, whereby when one pump and motor assembly increases in speed, the other pump and motor assembly decreases in speed and vice-versa, when said steering component is operated thus initiating steering movement to said unit, said steering component including a pinion rotated by said steering component, a pair of longitudinally extending rack bars one upon each side of said pinion and in spaced and parallel relationship with one another and engageable with said pinion, a link rod operatively connected between each rack bar and each of said speed control means, means mounting said rack bars for limited longitudinal sliding movement, and stop means engageable by one end of each of said rack bars when said speed lever is moved to the neutral position thereby centering said steering component and moving said speed control means on both of said pump and motor assemblies, to the neutral position.

13. The improvement according to claim 12 which includes a steering wheel, a steering column rotatable by said steering wheel, said pinion being mounted on the lower end of said steering column.

14. The improvement according to claim 13 in which said means mounting said rack bars for limited longitudinal sliding movement includes a casing, a hub on said casing, the lower end of said steering column being journalled for rotation in said hub, said pinion gear being situated in said casing, said rack gears being supported in said casing one upon each side of said pinion gear.

15. The improvement according to claim 14 in which said speed lever includes means within which speed lever engages in a plurality of incremental positions, linkage operatively extending between said speed lever and said casing mounting said rack gear and said pinions, and means on said frame mounting said casing for limited longitudinal sliding movement.

16. The improvement according to claim 15 in which said steering column is pivotted adjacent the upper end thereof to said frame, and a universal joint in said steering column adjacent the lower end thereof.

17. The improvement according to claim 16 which includes a reversing lever for each of said pump and motor assemblies, each of said reversing levers including linkage means operatively connecting said reversing levers to one each of said pump and motor assemblies.

18. The improvement according to claim 17 which includes further means on said linkage means enabling said reversing levers to override said rack gears.

19. The improvement according to claim 18 in which each of said link rods operatively connected between said rack gears and said speed control means includes a link pivotted by one end thereof to said frame and by the other end thereof to adjacent one end of said rack bars, said further means in said linkage means including a relatively short rod slidably engageable in one end of said link rod, a first pivot pin engaging through one end of said short rod and through said link intermediate the ends of said link, the ends of said pivot pin extending upon each side of said link, said reversing lever being pivotted by the lower end thereof to said frame, a second pivot pin extending through said reversing lever and through said link rod, said second pivot pin extending upon each side of said link rod and said reversing lever, and tension springs extending between the extending ends of said first pivot pin and the extending ends of said second pivot pin.

20. The improvement according to claim 15 which includes a reversing lever for each of said pump and motor assemblies, each of said reversing levers including linkage means operatively connecting said reversing levers to one each of said pump and motor assemblies.

21. The improvement according to claim 20 which includes further means on said linkage means enabling said reversing levers to override said rack gears.

22. The improvement according to claim 21 in which each of said link rods operatively connected between said rack gears and said speed control means includes a link pivotted by one end thereof to said frame and by the other end thereof to adjacent one end of said rack bars, said further means in said linkage means including a relatively short rod slidably engageable in one end of said link rod, a first pivot pin engaging through one end of said short rod and through said link intermediate the ends of said link, the ends of said pivot pin extending upon each side of said link, said reversing lever being pivotted by the lower end thereof to said frame, a second pivot pin extending through said reversing lever and through said link rod, said second pivot pin extending upon each side of said link rod and reversing lever, and tension springs extending between the extending ends of said first pivot pin and the extending ends of said second pivot pin.

* * * * *